US012603812B2

(12) United States Patent
Padebettu

(10) Patent No.: US 12,603,812 B2
(45) Date of Patent: Apr. 14, 2026

(54) VIRTUAL INTERNET PROTOCOL ADDRESS ASSOCIATED WITH SUBSCRIBER GROUP

(71) Applicant: Juniper Networks, Inc., Sunnyvale, CA (US)

(72) Inventor: Venkatesh Padebettu, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 364 days.

(21) Appl. No.: 18/493,617

(22) Filed: Oct. 24, 2023

(65) Prior Publication Data

US 2025/0132973 A1 Apr. 24, 2025

(51) Int. Cl.
*H04L 41/0659* (2022.01)
*H04L 12/46* (2006.01)

(52) U.S. Cl.
CPC ...... *H04L 41/0659* (2013.01); *H04L 12/4633* (2013.01)

(58) Field of Classification Search
CPC .................. H04L 12/4633; H04L 41/0659
See application file for complete search history.

(56) References Cited

U.S. PATENT DOCUMENTS

| 2016/0352623 | A1 | 12/2016 | Jayabalan et al. | |
| 2022/0377819 | A1* | 11/2022 | Zhou ..................... | H04W 76/11 |
| 2023/0156091 | A1 | 5/2023 | Poscic et al. | |
| 2023/0254914 | A1 | 8/2023 | Williams et al. | |

FOREIGN PATENT DOCUMENTS

| CN | | 113949634 A | * | 1/2022 | ......... | H04L 41/5051 |
| WO | WO-2023081395 A1 | | * | 5/2023 | .......... | H04W 88/085 |

OTHER PUBLICATIONS

Extended European Search Report for European Application No. EP24158886 dated Jul. 30, 2024, 10 pages.

* cited by examiner

*Primary Examiner* — Derrick V Rose
(74) *Attorney, Agent, or Firm* — Harrity & Harrity, LLP

(57) ABSTRACT
In some implementations, a network device may transmit an indication that a first access gateway function user plane (AGF-UP) device is associated with an active state for a subscriber group, an indication that a second AGF-UP device is associated with a backup state for the subscriber group, and an indication of a virtual internet protocol (IP) address associated with the subscriber group. The network device may transmit a failover indication that the second AGF-UP device is associated with the active state for the subscriber group.

20 Claims, 6 Drawing Sheets

100 ➙

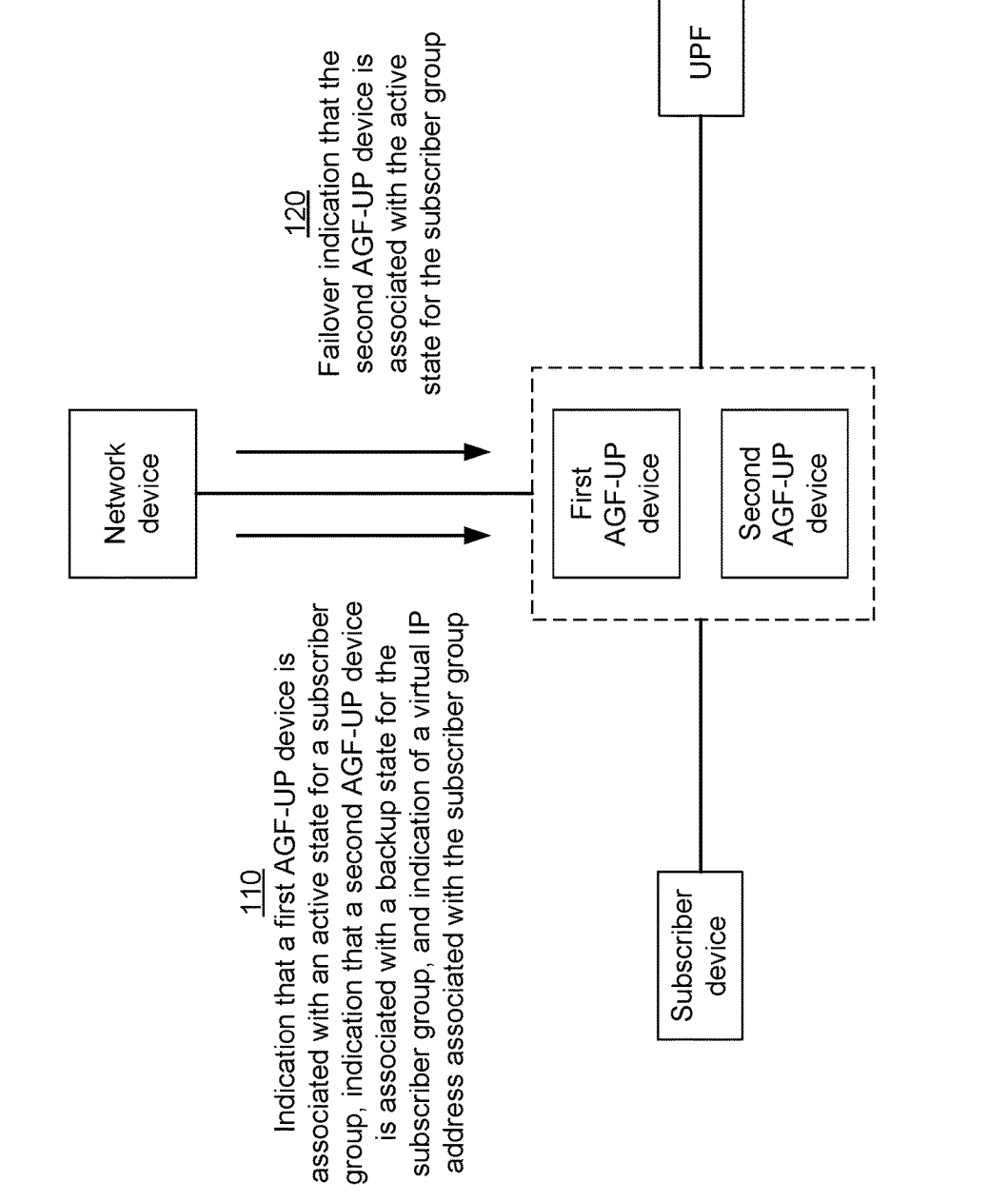

100

110
Indication that a first AGF-UP device is associated with an active state for a subscriber group, indication that a second AGF-UP device is associated with a backup state for the subscriber group, and indication of a virtual IP address associated with the subscriber group Network device 120
Failover indication that the second AGF-UP device is associated with the active state for the subscriber group First AGF-UP device Second AGF-UP device

UPF

Subscriber device

FIG. 1

| SGRP | Interface 1 | Interface 2 |
|---|---|---|
| SGRP A | UP1:PS1 | UP2:PS1 |
| SGRP B | UP2:PS2 | UP3:PS2 |
| SGRP C | UP3:PS3 | UP1:PS3 |

○ SGRP A – N3 virtual IP address X.X.X.X
SGRP A – CPRi virtual IP address Y.Y.Y.Y

300

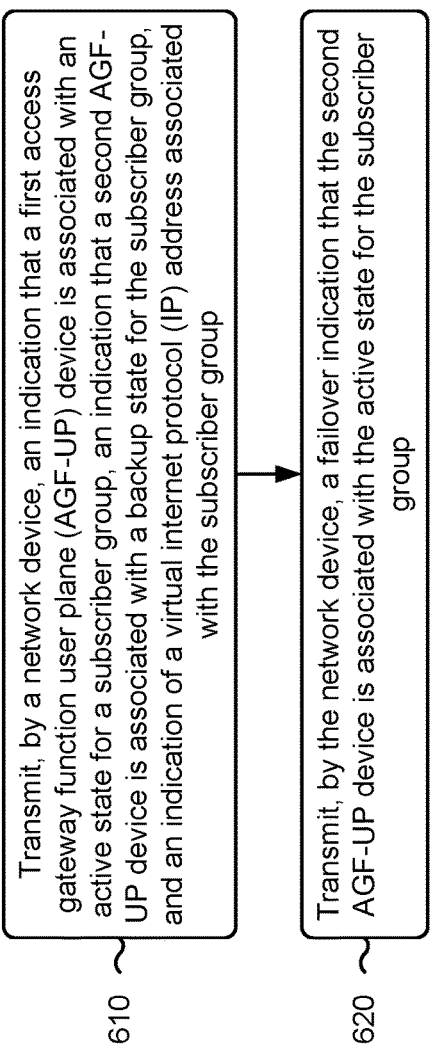

600

610 Transmit, by a network device, an indication that a first access gateway function user plane (AGF-UP) device is associated with an active state for a subscriber group, an indication that a second AGF-UP device is associated with a backup state for the subscriber group, and an indication of a virtual internet protocol (IP) address associated with the subscriber group 620 Transmit, by the network device, a failover indication that the second AGF-UP device is associated with the active state for the subscriber group

FIG. 6

VIRTUAL INTERNET PROTOCOL ADDRESS ASSOCIATED WITH SUBSCRIBER GROUP

BACKGROUND

In wireless and wireline convergence (WWC), a subscriber device (e.g., a customer premises equipment (CPE), such as a residential gateway (RG)) is serviced by both an access gateway function (AGF) and a user plane function (UPF) of a fifth-generation (5G) network. The AGF is responsible for providing services such as marking, policing, and shaping, whereas the UPF is responsible for providing services such as accounting and lawful intercept.

SUMMARY

Some implementations described herein relate to a method. The method may include transmitting, by a network device, an indication that a first AGF user plane (AGF-UP) device is associated with an active state for a subscriber group (SGRP), an indication that a second AGF-UP device is associated with a backup state for the SGRP, and an indication of a virtual internet protocol (IP) address associated with the SGRP. The method may include transmitting, by the network device, a failover indication that the second AGF-UP device is associated with the active state for the SGRP.

Some implementations described herein relate to a device. The device may include one or more memories and one or more processors. The one or more processors may be to transmit an indication that a first AGF-UP device is associated with an active state for an SGRP, an indication that a second AGF-UP device is associated with a backup state for the SGRP, and an indication of a virtual IP address associated with the SGRP, wherein the virtual IP address is associated with a local endpoint of an N3 tunnel. The one or more processors may be to transmit a failover indication that the second AGF-UP device is associated with the active state for the SGRP.

Some implementations described herein relate to a non-transitory computer-readable medium that stores a set of instructions. The set of instructions, when executed by one or more processors of a device, may cause the device to transmit an indication that a first AGF-UP device is associated with an active state for an SGRP, an indication that a second AGF-UP device is associated with a backup state for the SGRP, and an indication of a virtual IP address associated with the SGRP, wherein the virtual IP address is further associated with an endpoint of a CPRi tunnel. The set of instructions, when executed by one or more processors of the device, may cause the device to transmit a failover indication that the second AGF-UP device is associated with the active state for the SGRP.

BRIEF DESCRIPTION OF THE DRAWINGS

FIG. 1 is a diagram of an example implementation associated with a virtual IP address associated with an SGRP.

FIG. 6 is a flowchart of an example process associated with a virtual IP address associated with an SGRP.

DETAILED DESCRIPTION

Figure 2:
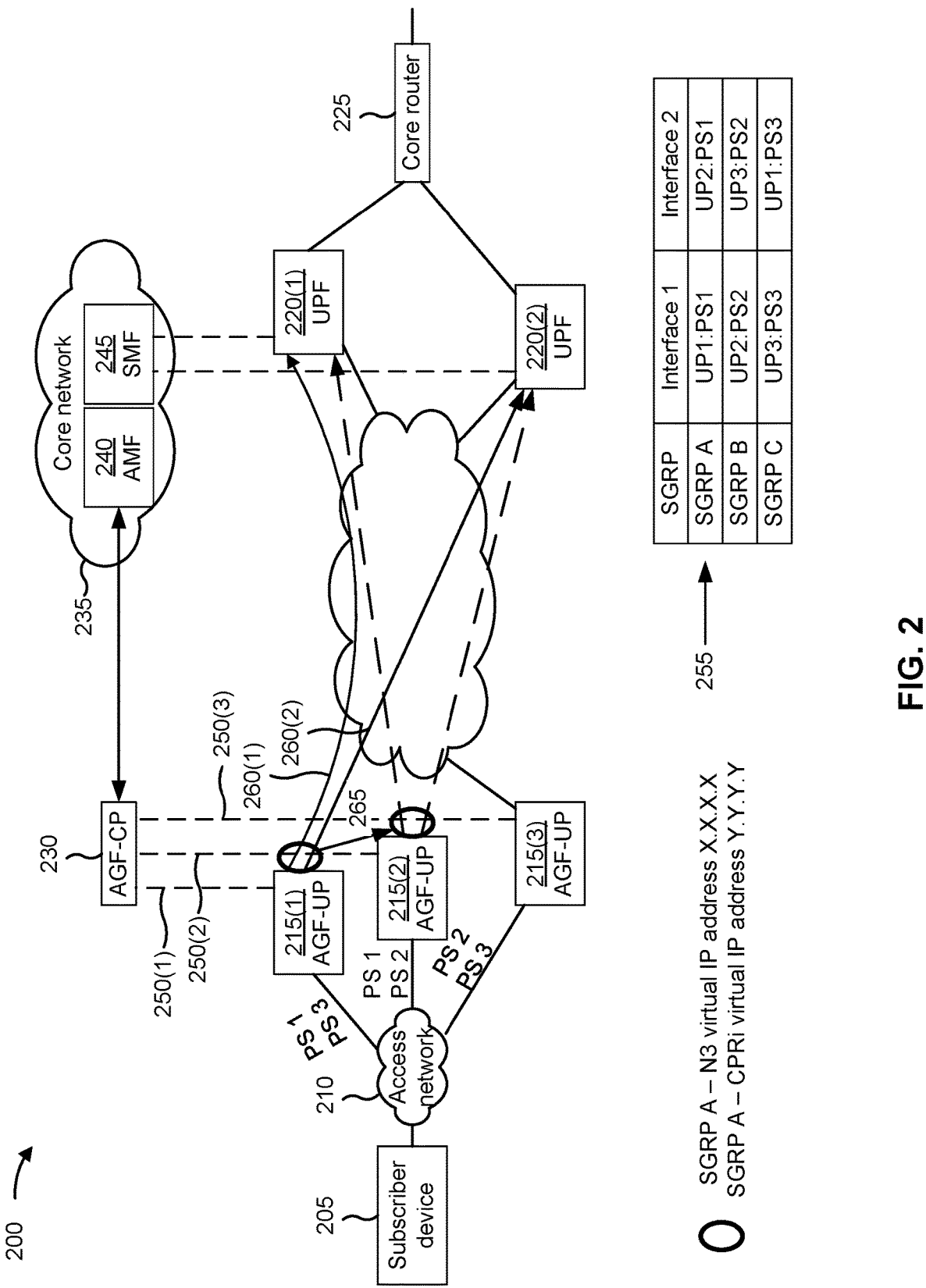
FIG. 2 is a diagram of an example implementation associated with an N3 virtual IP address and a CPRi virtual IP address.

The following detailed description of example implementations refers to the accompanying drawings. The same reference numbers in different drawings may identify the same or similar elements.

A broadband network gateway (BNG) routes traffic to and from broadband remote access devices, such as digital subscriber line access multiplexers (DSLAMs), on an Internet service provider (ISP) network. The BNG enables subscribers to connect to the broadband network, and performs authentication, authorization, and accounting; assigns Internet protocol (IP) addresses; and enforces quality of service (QOS) policies, among other examples.

To accommodate growths in a quantity of subscribers, a quantity and types of services being provided by BNGs, and an amount of traffic being processed by the BNGs, a disaggregated BNG (DBNG) may be deployed by a service provider. The DBNG physically and logically provides control and user plane separation (CUPS). For example, software to perform control plane functions may be distributed for execution by a BNG control plane (BNG-CP) device. Two or more BNG user plane (BNG-UP) devices may remain in a forwarding path between subscriber devices and a network to process traffic (e.g., packet flows) between the subscriber devices and the network. At least one of the BNG-UP devices may be an active BNG-UP device (e.g., the active BNG-UP device may handle the traffic), and at least one of the BNG-UP devices may be a backup BNG-UP device (e.g., in case the active BNG-UP device fails or otherwise ceases to be active).

Efforts are underway to migrate subscribers from DBNG to AGF CUPS in furtherance of WWC. WWC refers to the capability of a core network, such as a 5G core (5GC), to serve subscribers connecting over both wireless infrastructure and wireline infrastructure. For example, wireless infrastructure may enable a client device (e.g., a user equipment (UE) or the like) to connect to the core network over a wireless access network (e.g., a gNodeB). A wireline infrastructure may enable a subscriber device to connect to the core network over a wired access network using wireline access (e.g., transmission of information over a physical element, such as a fiber optic able, a coaxial cable, a twisted pair cable, and/or the like). DBNG, unlike AGF CUPS, provides only limited connectivity to the 5GC via wireline infrastructure.

AGF CUPS splits AGF functionality into AGF-UP devices and an AGF control plane (AGF-CP) device. For example, software to perform control plane functions may be distributed for execution by an AGF-CP device. Two or more AGF-UP devices may remain in a forwarding path between subscriber devices and a network to process traffic (e.g., packet flows) between the subscriber devices and the network. At least one of the AGF-UP devices may be an active AGF-UP device (e.g., the active AGF-UP device may handle the traffic), and at least one of the AGF-UP devices may be a backup AGF-UP device (e.g., in case the active AGF-UP device fails or otherwise ceases to be active).

For example, the active AGF-UP device may encapsulate packets in a general packet radio service (GPRS) tunnelling protocol (GTP) user plane (GTP-U) header before transmitting the packets to a UPF via an N3 interface (e.g., over an N3 tunnel, such as an N3 GTP tunnel). For example, the active AGF-UP device may transmit packets of one or more protocol data unit (PDU) sessions over one or more N3 tunnels. In some examples, each PDU session may have a unique corresponding N3 tunnel. The PDU sessions, which may belong to the same subscriber or to different subscribers, may be terminated on different UPFs (e.g., the N3 tunnels may terminate at different UPFs). The 5GC controls which PDU session(s) terminate on which UPF(s). The active AGF-UP device may transmit (and/or receive) packets via the N3 interface using an IP address of the active AGF-UP device. For example, the IP address may be exchanged (e.g., with a UPF) during signaling as part of a fully qualified tunnel endpoint identifier (F-TEID) for the N3 tunnel.

The AGF-CP device may send control packets to, and/or receive control packets from, the AGF-UP devices via a control packet redirect interface (CPRi). For example, each PDU session may have a unique corresponding subscriber server CPRi for packets destined for the UPF. One or more of the PDU sessions may be associated with an IPoE subscriber in adaptive mode (e.g., for a fixed network residential gateway).

DBNG deployments, but not AGF CUPS deployments, can use SGRPs to group subscribers and provision the active and backup BNG-UP devices appropriately. An SGRP includes a group of subscribers (e.g., subscribers that share similar or the same network traffic characteristics, service level agreements, or the like). As a result, the current SGRP model has gaps that render SGRPs (e.g., resiliency SGRPs) unsupported (e.g., unusable) in AGF CUPS, which hinders migration from DBNG to AGF CUPS and, thus, prevents advances toward WWC.

For example, a change (e.g., failover) from an active AGF-UP device to a backup AGF-UP device may involve excessive signaling due to re-negotiation of certain N3 tunnel parameters, such as the IP address of the backup AGF-UP device. For example, the AGF-CP device may transmit to the UPF, via the 5GC, an indication that the IP address has changed from the active AGF-UP device to the backup AGF-UP device, and the UPF transmits to the AGF-CP device, via the 5GC, an acknowledgment of the change. This signaling can lead to dropped packets, noticeably disrupting (e.g., interrupting) subscriber traffic and preventing seamless failover. Moreover, because the UPF does not handle subscribers on the SGRP-level, the AGF-CP transmits an individual indication, and receives an individual acknowledgment, for each subscriber in the SGRP. Thus, the signaling overhead increases by a multiple of the quantity of subscribers impacted by the change in the IP address.

Additionally, or alternatively, the change from the active AGF-UP device to the backup AGF-UP device may involve excessive control traffic signaling due to reassignment of the IP address of the backup AGF-UP device. For example, the AGF-CP device may re-negotiate at least one CPRi associated with a PDU session with the backup AGF-UP device. For example, the AGF-CP device may allocate the subscriber server tunnel endpoint identifiers (TEIDs) (e.g., associated with at least one CPRi) on the backup AGF-UP device to map the subscriber server TEIDs to the updated (e.g., correct) N3 tunnel parameters. Additionally, or alternatively, the AGF-CP device may synchronize one or more other parameters due to the failover.

Moreover, because IP prefixes are not associated with SGRPs, all subscriber routes are programmed independently. For example, IP prefixes are managed for independent subscribers, even if those subscribers belong to the same SGRP. As a result, excessive resources (e.g., processing resources, compute resources, memory resources, or the like) may be consumed to manage IP prefixes in the event of a failover.

Some implementations described herein enable SGRP support on AGFs. In some aspects, an AGF-CP device assigns one or more virtual IP addresses to an SGRP. For example, each SGRP may be associated with at least one virtual IP address. In some examples, the virtual IP address(es) may include a virtual N3 user plane IP address and/or a virtual server CPRi IP address. The AGF-UP device may use the virtual N3 user plane IP address to exchange user plane traffic with a UPF over an N3 tunnel, and/or the AGF-UP device may use the virtual server CPRi IP address to exchange control plane traffic with the AGF-CP device over a CPRi.

The AGF-CP device may provide an indication of the virtual IP address(es) to the active AGF-UP device and the backup AGF-UP device. Before failover, the virtual IP address(es) may be hosted by only the active AGF-UP device. For example, initially, the virtual IP address(es) may be activated on the active AGF-UP device and disabled on the backup AGF-UP device for the designated SGRP. Upon detecting a failover trigger, the AGF-CP device may activate the virtual IP address(es) on the backup AGF-UP device and disable the virtual IP address(es) on the active AGF-UP device. In this sense, the virtual IP address may migrate with the SGRP to the backup AGF-UP device in the event of a failover. If the virtual IP address(es) include a virtual N3 user plane IP address, the backup AGF-UP device may publish an updated route in a network connecting the backup AGF-UP device and the UPF such that the network can deliver packets from the UPF to the backup AGF-UP device rather than the previously active AGF-UP device.

As a result, the virtual IP address(es) may enhance the current SGRP model by helping to provide SGRP support on AGFs, and, thus, WWC. For example, the virtual N3 user plane IP address may reduce excessive signaling (e.g., traffic impact) between the AGF-CP device and the 5GC by avoiding a per-subscriber exchange with the 5GC that consumes inordinate amounts of bandwidth. Furthermore, the virtual N3 user plane IP address may enable a seamless failover from the active AGF-UP device to the backup AGF-UP device. For example, without a control exchange between the AGF-CP device and the 5GC, the failover may occur quickly (e.g., within sub-millisecond timeframes). The virtual server CPRi IP address may reduce signaling by allowing the AGF-CP device to avoid re-negotiating the CPRi after failover occurs. Moreover, because the virtual IP address(es) migrate with the SGRP, the IP prefixes also migrate with the SGRP, thereby reducing demand for IP prefix management.

FIG. 1 is a diagram of an example implementation 100 associated with a virtual IP address associated with an SGRP. As shown in FIG. 1, example implementation 100 includes a network device (e.g., an AGF-CP device), a subscriber device, a first AGF-UP device, a second AGF-UP device, and a UPF. These devices are described in more detail below in connection with FIGS. 3-5.

As shown by reference number 110, the network device may transmit, to the first AGF-UP device and the second AGF-UP device, an indication that the first AGF-UP device is associated with an active state for an SGRP, an indication that the second AGF-UP device is associated with a backup state for the SGRP, and an indication of a virtual IP address associated with the SGRP. For example, the first AGF-UP may be configured as an active AGF-UP for the SGRP, and the second AGF-UP may be configured as a backup AGF-UP for the SGRP. The virtual IP address may be an IP address that is not associated with a physical interface (e.g., a physical port). The virtual IP address may be referred to as a "loopback address," such as a "routable loopback IP address."

In some examples, the network device may transmit the indications in one or more packet forwarding control protocol (PFCP) information elements (IEs) in one or more PFCP node association messages and/or in one or more PFCP session establishment messages. The AGF-CP device may use the PFCP node associated message(s) to set up or update a PFCP association between the AGF-CP and the first AGF-UP device and/or second AGF-UP device. The PFCP node association message(s) may include one or more SGRP-grouped parameters, such as an SGRP identifier (ID), an SGRP state, a virtual MAC address, a logical port, and one or more SGRP flags. The SGRP ID may indicate an SGRP that the subscriber device belongs to, and the SGRP state may be "active" (e.g., for the first AGF-UP device) or "backup" (e.g., for the second AGF-UP device). The AGF-CP device may use the PFCP session establishment message(s) to indicate, to the first AGF-UP device and/or second AGF-UP device, one or more rules for processing and/or forwarding user plane traffic. The PFCP session establishment message(s) may include one or more SGRP-grouped parameters, such as the SGRP ID.

In some aspects, the virtual IP address may be associated with a local endpoint of an N3 tunnel. For example, the N3 tunnel may be configured to carry network traffic (e.g., network traffic of a PDU session of the subscriber device) between the active AGF-UP device and the UPF, and the local endpoint may be an N3 tunnel local endpoint for an AGF-UP device (e.g., the active AGF-UP device). The virtual IP address may be associated with the local endpoint of the N3 tunnel in that the virtual IP address may be used (directly or indirectly) to identify the AGF-UP device as a source of packets transmitted by the AGF-UP device over the N3 tunnel and/or as a destination of packets transmitted by the UPF over the N3 tunnel. In some examples, the AGF-CP device may transmit a PFCP node association message that contains an indication of the virtual IP address as a virtual N3 IP address.

In some aspects, the N3 tunnel may be associated with an F-TEID that is based on (e.g., contains or uses) the virtual IP address. For example, the F-TEID that is based on the virtual IP address may be an endpoint ID, of the N3 tunnel, that identifies the active AGF-UP device. In some examples, the AGF-CP may transmit a PFCP session establishment message that contains an indication of the F-TEID as an AGF-UP N3 F-TEID.

In some aspects, the N3 tunnel may be associated with an F-TEID that is associated with the UPF. For example, the F-TEID associated with the UPF may be an endpoint ID, of the N3 tunnel, that identifies the UPF. In some examples, the AGF-CP may transmit a PFCP session establishment message that contains an indication of the F-TEID as a UPF N3 F-TEID. In some examples, the F-TEID that is based on the virtual IP address and the F-TEID that is associated with the UPF may be the two endpoints of the N3 tunnel.

In some aspects, the virtual IP address may be associated with an endpoint of a CPRi tunnel. For example, the AGF-CP device may communicate with the active AGF-UP device over a CPRi tunnel (e.g., a tunnel that carries packets via a CPRi), and the endpoint may be a CPRi tunnel endpoint of an AGF-UP device (e.g., the active AGF-UP device). The virtual IP address may be associated with the endpoint of the CPRi tunnel in that the virtual IP address may be used (directly or indirectly) to identify the active AGF-UP device as a source of packets transmitted by the AGF-UP device over the CPRi tunnel and/or as a destination of packets transmitted by the AGF-CP over the CPRi tunnel. In some examples, the AGF-CP device may transmit a PFCP node association message that contains an indication of the virtual IP address as a virtual CPRi IP address.

In some aspects, the CPRi tunnel may be associated with an F-TEID that is based on (e.g., contains or uses) the virtual IP address. For example, the F-TEID that is based on the virtual IP address may be an endpoint ID, of the CPRi tunnel, that identifies the active AGF-UP device. In some examples, the AGF-CP may transmit a PFCP session establishment message that contains an indication of the F-TEID as an AGF-UP server CPRi F-TEID.

In some aspects, the CPRi tunnel may be associated with an F-TEID that is associated with the network device (e.g., the AGF-CP). For example, the F-TEID that is based on the virtual IP address may be an endpoint ID, of the CPRi tunnel, that identifies the AGF-CP device. In some examples, the AGF-CP may transmit a PFCP session establishment message that contains an indication of the F-TEID as an AGF-CP server CPRi F-TEID. In some examples, the F-TEID that is based on the virtual IP address and the F-TEID that is associated with the AGF-CP device may be the two endpoints of the CPRi tunnel.

In some aspects, the network device (e.g., AGF-CP) may transmit a virtual IP address associated with the local endpoint of the N3 tunnel and another virtual IP address, different from the virtual IP address associated with the local endpoint of the N3 tunnel, associated with the endpoint of the CPRi tunnel. For example, the virtual IP address associated with the local endpoint of the N3 tunnel may have a different numerical value than that of the virtual IP address associated with the endpoint of the CPRi tunnel. In other aspects, the virtual IP address may be associated with the local endpoint of the N3 tunnel and the endpoint of the CPRi tunnel. For example, the same virtual IP address may be associated with both the local endpoint of the N3 tunnel and the endpoint of the CPRi tunnel.

As shown by reference number 120, the network device may transmit a failover indication that the second AGF-UP device is associated with the active state for the SGRP. For example, the network device may transmit the failover indication in response to identifying a failover trigger (e.g., failure of the first AGF-UP device or the like). In some examples, the network may also transmit an indication that the first AGF-UP device is associated with the backup state.

In response to receiving the failover indication, the second AGF-UP device may communicate over the N3 tunnel and/or the CPRi tunnel using the information received over PFCP from the network device. For example, second AGF-UP device may establish one or more states using N3 tunnel endpoints (e.g., F-TEIDs) and/or CPRi tunnel endpoints (e.g., F-TEIDs). In some examples, the second AGF-UP device may communicate with the network device (e.g., the AGF-CP device) over the CPRi tunnel that was previously used by the first AGF-UP device. In some examples, the second AGF-UP device may publish an updated route in a network that connects the second AGF-UP device and the UPF, and upon route convergence (e.g., in the network and/or on the UPF), the second AGF-UP device and the UPF may communicate over the N3 tunnel that was previously used by the first AGF-UP device.

Transmitting the indication of the virtual IP address associated with the SGRP may reduce signaling and bandwidth consumption. For example, the second AGF-UP device may use the virtual IP address(es) to communicate over the N3 interface and/or on the CPRi without signaling between the AGF-CP device and the 5GC to establish new N3 tunnels, and/or between the AGF-CP device and the second AGF-UP device to establish new CPRi tunnels. Moreover, because the virtual IP address(es) migrate with the SGRP, the IP prefixes also migrate with the SGRP, thereby reducing demand for IP prefix management.

The virtual IP address being associated with the local endpoint of the N3 tunnel may reduce excessive signaling (e.g., traffic impact) between the AGF-CP and the 5GC. Because the virtual N3 user plane IP address moves with the SGRP, the AGF-CP may avoid notifying the 5GC of an SGRP switchover, thereby avoiding a per-subscriber exchange with the 5GC that consumes inordinate amounts of bandwidth. Moreover, because the SGRP switchover may remain hidden from the 5GC under the AGF-CP, the failover process may not depend on which UPF a PDU session of the SGRP is associated with. Thus, different subscribers may be connected to different UPFs. Furthermore, the virtual N3 user plane IP address may enable a seamless failover from the active AGF-UP to the backup AGF-UP. For example, without a control exchange between the AGF-CP and the 5GC, the failover may occur quickly. For example, an updated route published by the AGF-UP in the network may converge in the network and on the UPF quickly (e.g., within sub-millisecond timeframes), thereby reducing drops during failover time.

The virtual IP address being associated with the endpoint of the CPRi tunnel may reduce signaling by allowing the AGF-CP to avoid re-negotiating the CPRi tunnel after failover occurs. The virtual IP address being associated with the local endpoint of the N3 tunnel and the endpoint of the CPRi tunnel may reduce memory consumption by avoiding storage of multiple virtual IP addresses. The virtual IP address associated with the local endpoint of the N3 tunnel being a first virtual IP address, and a second virtual IP address, different from the first virtual IP address, being associated with the endpoint of the CPRi tunnel may improve configurability options.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

FIG. 2 is a diagram of an example implementation 200 associated with an N3 virtual IP address and a CPRi virtual IP address.

Example implementation 200 includes a subscriber device 205, an access network 210 (e.g., a wired access network), AGF-UPs 215(1)-215(3) (e.g., AGF-UP devices), UPFs 220(1) and 220(2), core router 225, AGF-CP 230 (e.g., an AGF-CP device), and core network 235. The core network 235 may be a 5GC network that includes one or more 5G components, such as an access and mobility management function (AMF) 240, a session management function (SMF) 245, or the like.

The AGF-CP 230 may be configured to handle control plane operations on behalf of AGF-UPs 215(1)-215(3), and the core network 235 may be configured to handle control plane operations on behalf of UPFs 220(1) and 220(2). For example, the AGF-CP 230 may communicate with the AMF 240, and the SMF 245 may communicate with the UPFs 220(1) and 220(2).

The AGF-UPs 215(1)-215(3) may communicate with the AGF-CP 230 over CPRi tunnels 250(1)-250(3), respectively. For example, the AGF-CP 230 may configure AGF-UPs 215(1)-215(3) with SGRPs A-C via CPRi tunnels 250(1)-250(3). The access network 210 and one or more of AGF-UPs 215(1)-215(3) may exchange network traffic belonging to SGRP A over pseudowire 1 (PS1), network traffic belonging to SGRP B over pseudowire 2 (PS2), and/or network traffic belonging to SGRP C over pseudowire 3 (PS3).

Table 255 shows the mapping of AGF-UPs 215(1)-215(3) to SGRPs A-C, where "Interface 1" represents an active configuration and "Interface 2" represents a backup configuration. As shown, for SGRP A ("PS1"), the AGF-UP 215(1) ("UP1") may be configured as the active AGF-UP and the AGF-UP 215(2) ("UP2") may be configured as the backup AGF-UP; for SGRP B ("PS2"), the AGF-UP 215(2) may be configured as the active AGF-UP and the AGF-UP 215(3) ("UP3") may be configured as the backup AGF-UP; and for SGRP C ("PS3"), the AGF-UP 215(3) may be configured as the active AGF-UP and the AGF-UP 215(1) may be configured as the backup AGF-UP.

In some examples, the AGF-CP 230 may pre-provision AGF-UPs 215(1) and 215(2) for SGRP A by transmitting PFCP node association messages to the AGF-UPs 215(1) and 215(2). The PFCP node association messages may indicate the state of AGF-UPs 215(1) and 215(2) for SGRP A, a virtual IP address associated with SGRP A and an N3 tunnel ("N3 virtual IP address X.X.X.X"), and/or a virtual IP address associated with SGRP A and a CPRi tunnel ("CPRi virtual IP address Y.Y.Y.Y"). For example, the state of AGF-UP 215(1) for SGRP A may be active, and the state of AGF-UP 215(2) for SGRP A may be backup. The N3 tunnel may be N3 tunnel 260(1) or N3 tunnel 260(2), and the CPRi tunnel may be CPRi tunnel 250(1). Thus, both AGF-UP 215(1) and AGF-UP 215(2) may obtain information for communicating with the UPF 220(1) and/or the UPF 220(2) (e.g., the N3 virtual IP address X.X.X.X), but the N3 virtual IP address X.X.X.X may remain disabled on the AGF-UP 215(2).

In some examples, the subscriber device 205 may send a dynamic host configuration protocol (DHCP) packet over the PS1, and the access network 210 may transmit the DHCP packet to the AGF-UP 215(1). Based on the DHCP packet, the AGF-UP 215(1) may transmit an indication of the IP address of the subscriber device to the AGF-CP 230, which may determine that the subscriber device belongs to SGRP A.

The AGF-CP 230 may transmit, to the AGF-UPs 215(1) and 215(2), PFCP session establishment messages containing information including a CPRi F-TEID, an N3 F-TEID, or the like. The AGF-UP 215(1) may establish N3 tunnel 260(1) and/or N3 tunnel 260(2) with UPF 220(1) and/or the UPF 220(2). Network traffic associated with the subscriber device 205 may flow between AGF-UP 215(1) and the UPF 220(1) and/or the UPF 220(2) via the N3 tunnels 260(1) and/or 260(2).

Sometime thereafter, the AGF-CP 230 may detect that AGF-UP 215(1) has failed and signal a failover to at least AGF-UP 215(2). For example, the AGF-CP 230 may trigger a state change in the AGF-UP 215(2) from backup to active for SGRP A. In response to the state change, the AGF-UP 215(2) may activate the virtual IP addresses. For example, the AGF-UP 215(2) may use the CPRi virtual IP address Y.Y.Y.Y in the CPRi F-TEID, which may serve as an endpoint ID for the CPRi tunnel 250(1). Additionally, or alternatively, the AGF-UP 215(2) may use the N3 virtual IP address X.X.X.X in the N3 F-TEID, which may serve as an endpoint ID for the N3 tunnel 260(1) or the N3 tunnel 260(2). The AGF-UP 215(2) may publish the updated route to routing tables in the network connecting AGF-UPs 215(1)-215(3) and UPFs 220(1) and 220(2), and upon route convergence, network traffic may begin flowing between the AGF-UP 215(2) and the UPFs 220(1) and/or 220(2). For example, as shown by reference 265, the N3 tunnels 260(1) and 260(2) may migrate from the AGF-UP 215(1) to the AGF-UP 215(2).

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
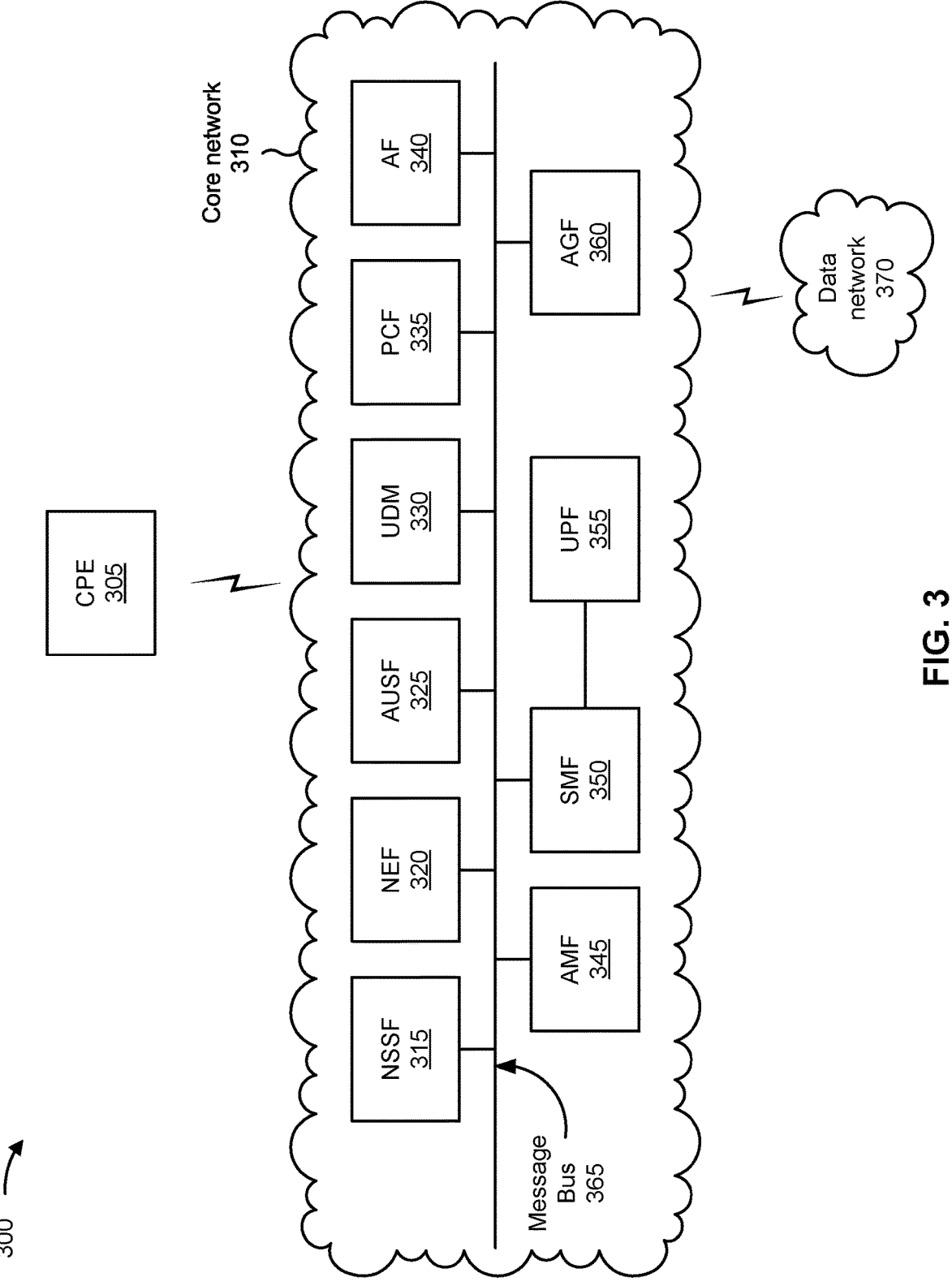
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include a CPE 305, a core network 310, and a data network 370. Devices and/or networks of the example environment 300 may interconnect via wired connections, wireless connections, or a combination of wired and wireless connections.

The CPE 305 may include one or more devices capable of receiving, processing, storing, routing, and/or providing traffic (e.g., a packet and/or other information or metadata) in a manner described herein. For example, the CPE 305 may include a router, such as a label switching router (LSR), a label edge router (LER), an ingress router, an egress router, a provider router (e.g., a provider edge router or a provider core router), a virtual router, or another type of router. Additionally, or alternatively, the CPE 305 may include a gateway, a switch, a firewall, a hub, a bridge, a reverse proxy, a server (e.g., a proxy server, a cloud server, or a data center server), a load balancer, and/or a similar device. In some implementations, the CPE 305 may be a physical device implemented within a housing, such as a chassis. In some implementations, the CPE 305 may be a virtual device implemented by one or more computing devices of a cloud computing environment or a data center. In some implementations, a group of CPEs 305 may be a group of data center nodes that are used to route traffic flow through a network.

In some implementations, the core network 310 may include an example functional architecture in which systems and/or methods described herein may be implemented. For example, the core network 310 may include an example architecture of a fifth generation (5G) next generation (NG) core network included in a 5G wireless telecommunications system. While the example architecture of the core network

310 shown in FIG. 3 may be an example of a service-based architecture, in some implementations, the core network 310 may be implemented as a reference-point architecture and/or a 4G core network, among other examples.

As shown in FIG. 3, the core network 310 may include a number of functional elements. The functional elements may include, for example, a network slice selection function (NSSF) 315, a network exposure function (NEF) 320, an authentication server function (AUSF) 325, a unified data management (UDM) component 330, a policy control function (PCF) 335, an application function (AF) 340, an AMF 345, an SMF 350, a UPF 355, and/or an AGF 360. These functional elements may be communicatively connected via a message bus 365. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 315 includes one or more devices that select network slice instances for the CPE 305. By providing network slicing, the NSSF 315 allows an operator to deploy multiple substantially independent end-to-end networks potentially with the same infrastructure. In some implementations, each slice may be customized for different services.

The NEF 320 includes one or more devices that support exposure of capabilities and/or events in the wireless telecommunications system to help other entities in the wireless telecommunications system discover network services.

The AUSF 325 includes one or more devices that act as an authentication server and support the process of authenticating the CPE 305 in the wireless telecommunications system.

The UDM 330 includes one or more devices that store user data and profiles in the wireless telecommunications system. The UDM 330 may be used for fixed access and/or mobile access in the core network 310.

The PCF 335 includes one or more devices that provide a policy framework that incorporates network slicing, roaming, packet processing, and/or mobility management, among other examples.

The AF 340 includes one or more devices that support application influence on traffic routing, access to the NEF 320, and/or policy control, among other examples.

The AMF 345 includes one or more devices that act as a termination point for non-access stratum (NAS) signaling and/or mobility management, among other examples.

The SMF 350 includes one or more devices that support the establishment, modification, and release of communication sessions in the wireless telecommunications system. For example, the SMF 350 may configure traffic steering policies at the UPF 355 and/or may enforce UE IP address allocation and policies, among other examples.

The UPF 355 includes one or more devices that serve as an anchor point for intra-radio-access-technology and/or inter-radio-access-technology mobility. The UPF 355 may apply rules to packets, such as rules pertaining to packet routing, traffic reporting, and/or handling user plane QoS, among other examples.

The AGF 360 includes one or more devices that provide provides authentication, authorization, and accounting (AAA) services and hierarchical traffic shaping and policing for fixed network and 5G residential gateways (e.g., the CPE 305) being served from the UPF 355.

The message bus 365 represents a communication structure for communication among the functional elements. In other words, the message bus 365 may permit communication between two or more functional elements.

The data network 370 includes one or more wired and/or wireless data networks. For example, the data network 370 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the example environment 300 may perform one or more functions described as being performed by another set of devices of the example environment 300.

Figure 4:
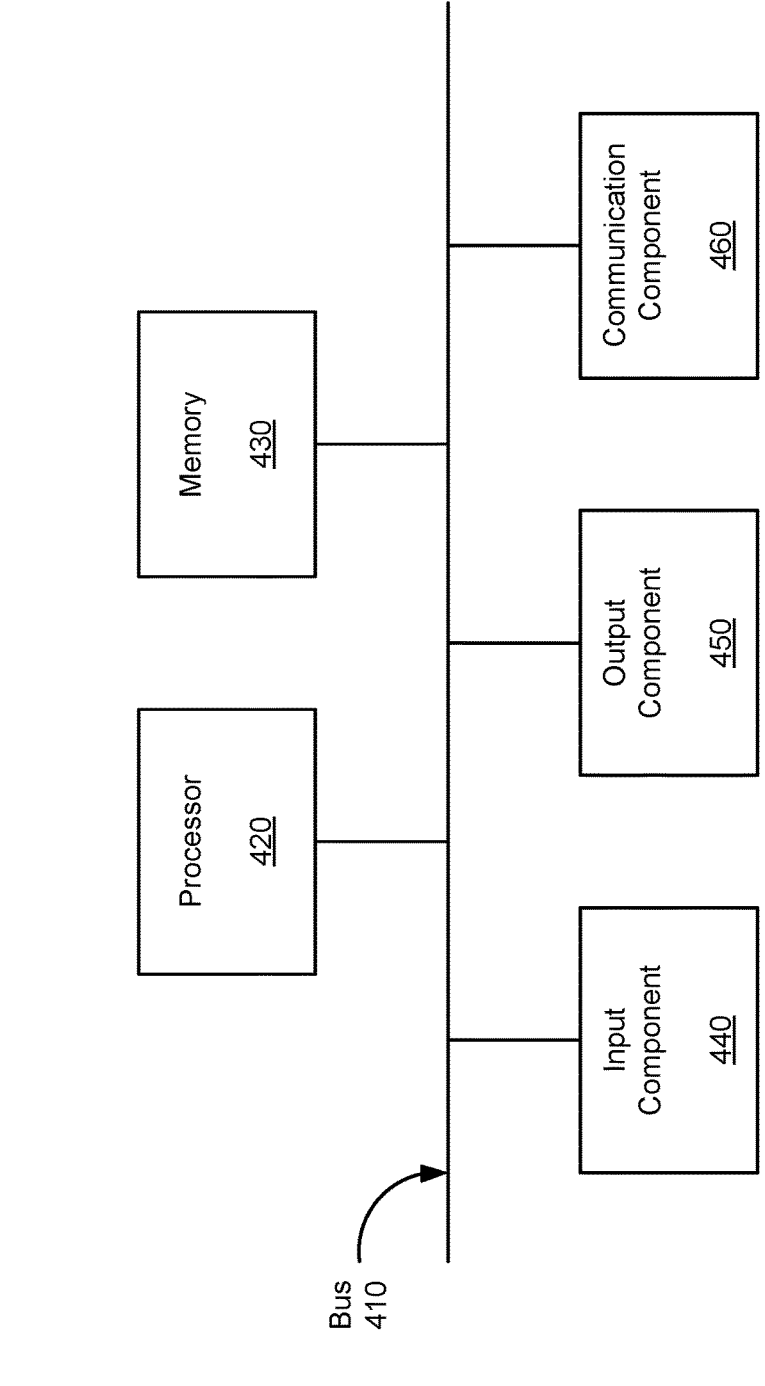
FIG. 4 is a diagram of example components of one or more devices of FIG. 3.

FIG. 4 is a diagram of example components of one or more devices of FIG. 3. The example components may be included in a device 400, which may correspond to the CPE 305, the NSSF 315, the NEF 320, the AUSF 325, the UDM component 330, the PCF 335, the AF 340, the AMF 345, the SMF 350, the UPF 355, and/or the AGF 360. In some implementations, the CPE 305, the NSSF 315, the NEF 320, the AUSF 325, the UDM component 330, the PCF 335, the AF 340, the AMF 345, the SMF 350, the UPF 355, and/or the AGF 360 may include one or more devices 400 and/or one or more components of the device 400. As shown in FIG. 4, the device 400 may include a bus 410, a processor 420, a memory 430, an input component 440, an output component 450, and a communication interface 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit (CPU), a graphics processing unit (GPU), an accelerated processing unit (APU), a microprocessor, a controller, a microcontroller, a digital signal processor (DSP), a field-programmable gate array (FPGA), an application-specific integrated circuit (ASIC), and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication interface 460 enables the device 400 to communicate with other devices via a wired connection and/or a wireless connection. For example, the communication interface 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
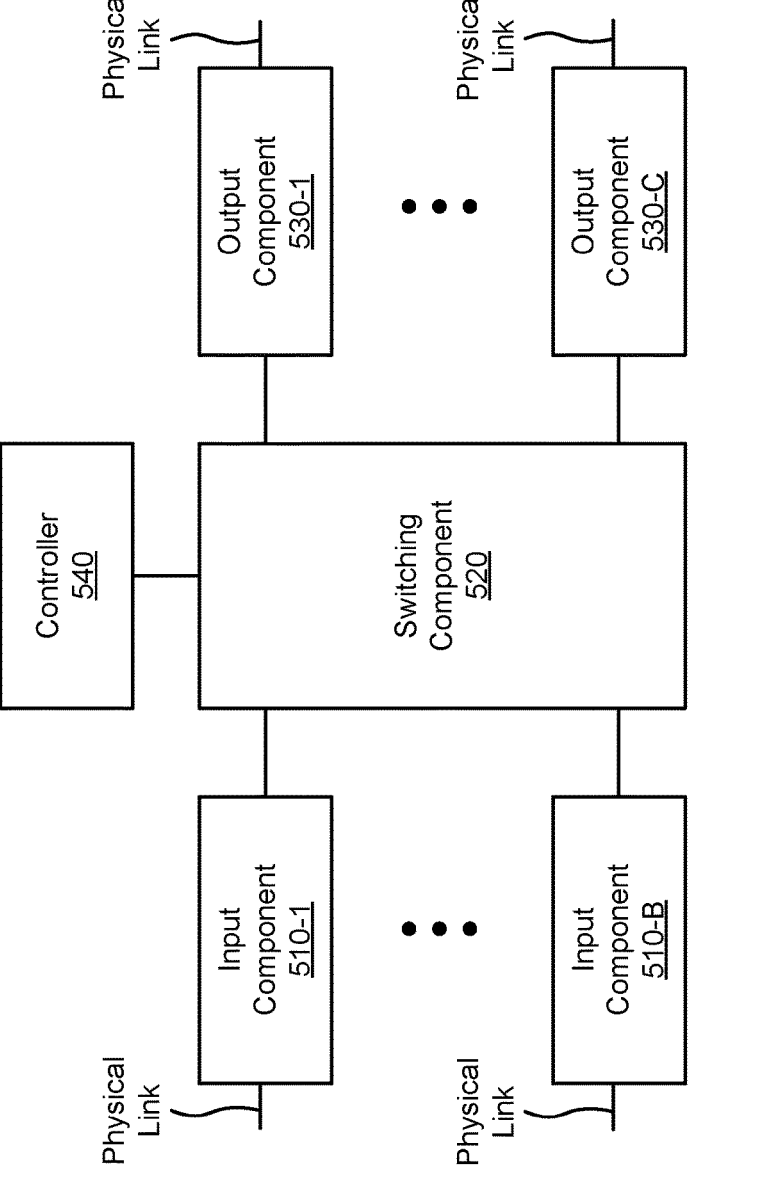
FIG. 5 is a diagram of example components of one or more devices of FIG. 3.

FIG. 5 is a diagram of example components of one or more devices of FIG. 3. The example components may be included in a device 500. The device 500 may correspond to the CPE 305, the NSSF 315, the NEF 320, the AUSF 325, the UDM component 330, the PCF 335, the AF 340, the AMF 345, the SMF 350, the UPF 355, and/or the AGF 360. In some implementations, the CPE 305, the NSSF 315, the NEF 320, the AUSF 325, the UDM component 330, the PCF 335, the AF 340, the AMF 345, the SMF 350, the UPF 355, and/or the AGF 360 may include one or more devices 500 and/or one or more components of the device 500. As shown in FIG. 5, the device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

The input component 510 may be one or more points of attachment for physical links and may be one or more points of entry for incoming traffic, such as packets. The input component 510 may process incoming traffic, such as by performing data link layer encapsulation or decapsulation. In some implementations, the input component 510 may transmit and/or receive packets. In some implementations, the input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, the device 500 may include one or more input components 510.

The switching component 520 may interconnect the input components 510 with the output components 530. In some implementations, the switching component 520 may be implemented via one or more crossbars, via busses, and/or with shared memories. The shared memories may act as temporary buffers to store packets from the input components 510 before the packets are eventually scheduled for delivery to the output components 530. In some implementations, the switching component 520 may enable the input components 510, the output components 530, and/or the controller 540 to communicate with one another.

The output component 530 may store packets and may schedule packets for transmission on output physical links. The output component 530 may support data link layer encapsulation or decapsulation, and/or a variety of higher-level protocols. In some implementations, the output component 530 may transmit packets and/or receive packets. In some implementations, the output component 530 may include an output line card that includes one or more packet processing components (e.g., in the form of integrated circuits), such as one or more IFCs, packet forwarding components, line card controller components, output ports, processors, memories, and/or output queues. In some implementations, the device 500 may include one or more output components 530. In some implementations, the input component 510 and the output component 530 may be implemented by the same set of components (e.g., and input/output component may be a combination of the input component 510 and the output component 530).

The controller 540 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 540 may include one or more processors that can be programmed to perform a function.

In some implementations, the controller 540 may include a RAM, a ROM, and/or another type of dynamic or static storage device (e.g., a flash memory, a magnetic memory, an optical memory, etc.) that stores information and/or instructions for use by the controller 540.

In some implementations, the controller 540 may communicate with other devices, networks, and/or systems connected to the device 500 to exchange information regarding network topology. The controller 540 may create routing tables based on the network topology information, may create forwarding tables based on the routing tables, and may forward the forwarding tables to the input components 510 and/or output components 530. The input components 510 and/or the output components 530 may use the forwarding tables to perform route lookups for incoming and/or outgoing packets.

The controller 540 may perform one or more processes described herein. The controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 540 from another computer-readable medium or from another device via a communication interface. When executed, software instructions stored in a memory and/or storage component associated with the controller 540 may cause the controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, the device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

FIG. 6 is a flowchart of an example process 600 associated with a virtual IP address associated with an SGRP. In some implementations, one or more process blocks of FIG. 6 are performed by a network device (e.g., the network device of the FIG. 1). In some implementations, one or more process blocks of FIG. 6 are performed by another device or a group of devices separate from or including the network device, such as a CPE (e.g., CPE 305), an NSSF (e.g., the NSSF 315), an NEF (e.g., the NEF 320), an AUSF (e.g., the AUSF 325), a UDM component (e.g., the UDM component 330), a PCF (e.g., the PCF 335), an AF (e.g., the AF 340), an AMF (e.g., the AMF 345), an SMF (e.g., the SMF 350), a UPF (e.g., the UPF 355), and/or an AGF (e.g., the AGF 360). Additionally, or alternatively, one or more process blocks of FIG. 6 may be performed by one or more components of device 400, such as processor 420, memory 430, input component 440, output component 450, and/or communication component 460, and/or one or more components of device 500, such as input components 510, a switching component 520, one or more output components 530, and a controller 540.

As shown in FIG. 6, process 600 may include transmitting an indication that a first AGF-UP device is associated with an active state for an SGRP, an indication that a second AGF-UP device is associated with a backup state for the SGRP, and an indication of a virtual IP address associated with the SGRP (block 610). For example, the network device may transmit an indication that a first AGF-UP device is associated with an active state for an SGRP, an indication that a second AGF-UP device is associated with a backup state for the SGRP, and an indication of a virtual IP address associated with the SGRP, as described above.

As further shown in FIG. 6, process 600 may include transmitting a failover indication that the second AGF-UP device is associated with the active state for the SGRP (block 620). For example, the network device may transmit a failover indication that the second AGF-UP device is associated with the active state for the SGRP, as described above.

Process 600 may include additional implementations, such as any single implementation or any combination of implementations described below and/or in connection with one or more other processes described elsewhere herein.

In a first implementation, the virtual IP address is associated with a local endpoint of an N3 tunnel.

In a second implementation, alone or in combination with the first implementation, the virtual IP address is a first virtual IP address, process 600 includes transmitting a second virtual IP address associated with an endpoint of a CPRi tunnel, and the second virtual IP address is different from the first virtual IP address.

In a third implementation, alone or in combination with the first implementation, the virtual IP address is further associated with an endpoint of a CPRi tunnel.

In a fourth implementation, alone or in combination with one or more of the first through third implementations, an F-TEID associated with the N3 tunnel is based on the virtual IP address.

In a fifth implementation, alone or in combination with one or more of the first through fourth implementations, an F-TEID associated with a UPF is associated with the N3 tunnel.

In a sixth implementation, alone or in combination with one or more of the first through fifth implementations, the virtual IP address is associated with an endpoint of a CPRi tunnel.

In a seventh implementation, alone or in combination with one or more of the first through sixth implementations, an F-TEID associated with the CPRi tunnel is based on the virtual IP address.

In an eighth implementation, alone or in combination with one or more of the first through seventh implementations, an F-TEID associated with the network device is associated with the CPRi tunnel.

In a ninth implementation, alone or in combination with one or more of the first through eighth implementations, the network device is an AGF-CP device.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a PDU, a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

transmitting, by a network device, an indication that a first access gateway function user plane (AGF-UP) device is associated with an active state for a subscriber group, an indication that a second AGF-UP device is associated with a backup state for the subscriber group, and an indication of a virtual internet protocol (IP) address associated with the subscriber group; and transmitting, by the network device, a failover indication that the second AGF-UP device is associated with the active state for the subscriber group.

2. The method of claim 1, wherein the virtual IP address is associated with a local endpoint of an N3 tunnel.

3. The method of claim 2, wherein the virtual IP address is a first virtual IP address, the method further comprising:

transmitting, by the network device, a second virtual IP address associated with an endpoint of a control packet redirect interface (CPRi) tunnel, wherein the second virtual IP address is different from the first virtual IP address.

4. The method of claim 2, wherein the virtual IP address is further associated with an endpoint of a control packet redirect interface (CPRi) tunnel.

5. The method of claim 2, wherein a fully qualified tunnel endpoint identifier (F-TEID) associated with the N3 tunnel is based on the virtual IP address.

6. The method of claim 2, wherein a fully qualified tunnel endpoint identifier (F-TEID) associated with a user plane function (UPF) is associated with the N3 tunnel.

7. The method of claim 1, wherein the virtual IP address is associated with an endpoint of a control packet redirect interface (CPRi) tunnel.

8. The method of claim 7, wherein a fully qualified tunnel endpoint identifier (F-TEID) associated with the CPRi tunnel is based on the virtual IP address.

9. The method of claim 7, wherein a fully qualified tunnel endpoint identifier (F-TEID) associated with the network device is associated with the CPRi tunnel.

10. The method of claim 1, wherein the network device is an access gateway function control plane (AGF-CP) device.

11. A device, comprising:

one or more memories; and one or more processors to:

transmit an indication that a first access gateway function user plane (AGF-UP) device is associated with an active state for a subscriber group, an indication that a second AGF-UP device is associated with a backup state for the subscriber group, and an indication of a virtual internet protocol (IP) address associated with the subscriber group, wherein the virtual IP address is associated with a local endpoint of an N3 tunnel; and transmit a failover indication that the second AGF-UP device is associated with the active state for the subscriber group.

12. The device of claim 11, wherein the virtual IP address is a first virtual IP address, and wherein the one or more processors are further to:

transmit a second virtual IP address associated with an endpoint of a control packet redirect interface (CPRi) tunnel, wherein the second virtual IP address is different from the first virtual IP address.

13. The device of claim 11, wherein the virtual IP address is further associated with an endpoint of a control packet redirect interface (CPRi) tunnel.

14. The device of claim 11, wherein a fully qualified tunnel endpoint identifier (F-TEID) associated with the N3 tunnel is based on the virtual IP address.

15. The device of claim 11, wherein a fully qualified tunnel endpoint identifier (F-TEID) associated with a user plane function (UPF) is associated with the N3 tunnel.

16. A non-transitory computer-readable medium storing a set of instructions, the set of instructions comprising:

one or more instructions that, when executed by one or more processors of a device, cause the device to:

transmit an indication that a first access gateway function user plane (AGF-UP) device is associated with an active state for a subscriber group, an indication that a second AGF-UP device is associated with a backup state for the subscriber group, and an indication of a virtual internet protocol (IP) address associated with the subscriber group, wherein the virtual IP address is further associated with an endpoint of a control packet redirect interface (CPRi) tunnel; and transmit a failover indication that the second AGF-UP device is associated with the active state for the subscriber group.

17. The non-transitory computer-readable medium of claim 16, wherein a fully qualified tunnel endpoint identifier (F-TEID) associated with the CPRi tunnel is based on the virtual IP address.

18. The non-transitory computer-readable medium of claim 16, wherein a fully qualified tunnel endpoint identifier (F-TEID) associated with the device is associated with the CPRi tunnel.

19. The non-transitory computer-readable medium of claim 16, wherein the virtual IP address is a first virtual IP address, and wherein the one or more instructions, when executed by the one or more processors of the device, further cause the device to:

transmit a second virtual IP address associated with a local endpoint of an N3 tunnel, wherein the second virtual IP address is different from the first virtual IP address.

20. The non-transitory computer-readable medium of claim 16, wherein the virtual IP address is further associated with a local endpoint of an N3 tunnel.

* * * * *